INFORMATION STORAGE SYSTEM FOR MICROWAVE COMPUTER

Filed July 3, 1961 2 Sheets-Sheet 1

MEMORY CAPACITY, LENGTH, AVERAGE ACCESS TIME, FOR 2 mμs BIT PERIOD

INVENTOR.
STANLEY P. FRANKEL.
BY
William C. Cahill

INVENTOR.
STANLEY P. FRANKEL.
BY
William C. Cahill

United States Patent Office 3,187,308
Patented June 1, 1965

3,187,308
INFORMATION STORAGE SYSTEM FOR MICROWAVE COMPUTER

Stanley P. Frankel, Los Angeles, Calif., assignor to General Electric Company, a corporation of New York
Filed July 3, 1961, Ser. No. 121,707
6 Claims. (Cl. 340—173)

This invention relates to memories for storing digital information, and more particularly, to means for storing digital information represented by pulses of high frequency energy.

In the processing of information, such as data, various logical and arithmetic operations are performed thereon. These operations are performed at relatively high speeds by the more modern data processing systems, which are primarily electronic; i.e., these systems operate on electrical signals representing data by means of electron tubes, diodes and transistors. It has been found by experience that these electronic data processing systems are most reliable when the electronic portions thereof need handle only data which is basically of binary digital form. In binary digital data processing systems, each element of information, termed a "bit," is represented by either a 1 or a 0. In the binary digital data processing systems of the prior art, it has been customary to represent these bits by the presence and absence of electrical signals at specified locations in the system at predetermined times; for example, an electronic gate may be "opened" at a particular time by a system "clock" signal and if there is an input data signal applied to the gate at that moment, the numeral 1 is said to be present, whereas if there is no input signal applied to the gate, the numeral 0 is said to be present.

Inasmuch as it is desirable to operate data processing systems at high rates of speed, these clock signals must recur at a rapid rate. This rate of recurrence is known as the "clock rate." In a typical prior art electronic data processing system a clock rate of 100,000 clock signals per second is employed and, consequently, the data signals appearing at various utilization locations in such system must represent 100,000 bits per second. Thus, the duration of the electrical signal representing the binary 1 must be very short (in the above example, less than 10 microseconds duration) and, hence, this signal is actually an electrical pulse. The representation of binary digital data by the presence and absence of electrical pulses may be termed "pulse no-pulse" script.

In order to process data at increasing speeds, system clock rates may be increased. However, the maximum frequencies at which conventional electron tube, diode and transistor circuit elements can effectively amplify or transmit electrical signals, place a serious upper limit on the clock rate of the above-mentioned prior art electronic data processing systems. The relatively narrow bandwidth for which circuit elements of these prior art systems can effectively amplify and transmit electrical signals is another serious obstacle which impedes efforts to accommodate clock rate increases and their accompanying increased bandwidths. Therefore, if it is desired to build an effective high speed data processing system employing clock pulse signals recurring at rates of approximately $10^9$ pulses per second, it is desirable to employ traveling-wave tubes as active circuit elements since amplifiers employing traveling-wave tubes are well-known for their ability to amplify rapidly changing signals constituting a broad range of frequencies.

Ordinary storage techniques utilized in previous data processing systems are unsuitable for use in systems utilizing clock rates of $10^9$ pulses per second and higher. An information storage system suitable for storing digital information at high clock rates is described and claimed in application Serial Number 82,036 by William A. Edson, filed January 11, 1961, and assigned to the assignee of the present invention. In that application, a recirculating storage system is described utilizing a delay element to facilitate loop storage; however, present technology limits the maximum delay time obtainable with ordinary delay elements. For example, phase distortion in wave guiding structures prohibits the utilization of wave guiding means for long delays thus preventing the storage of large quantities of microwave digital information-containing signals in recirculation type storage loops. Therefore, a need still exists for a bulk memory capable of storing large quantities of information represented by electromagnetic signals having frequencies in the microwave region of the frequency spectrum.

Accordingly, it is an object of the present invention to provide a means for storing digital information.

It is another object of the present invention to provide a means for storing electromagnetic signals representing digital information.

It is still another object of the present invention to provide a means for storing electromagnetic signals having a frequency in the microwave region of the frequency spectrum.

Further objects and advantages of the present invention will become apparent as the description thereof proceeds.

Briefly, in accordance with one embodiment of the present invention, an information storage system is provided for use with the microwave computer wherein the information, in the form of electromagnetic signals, is transmitted through space, received, amplified, and retransmitted. Thus, the storage system includes a recirculating loop which continues to transmit, receive, and retransmit the electromagnetic signals representing digital information. The synchronization of the pulses, which are bursts of RF energy, may be maintained by the application of a clock pulse to the amplifier in the recirculation loop; accordingly, the source of the clock pulses may conveniently be the clock generator of the computer system of which the information storage system is to act as the bulk memory.

The invention, both as to its organization and operation together with any further objects and advantages thereof, may best be understood by reference to the following description taken in connection with the accompanying drawings in which.

Figure 1:
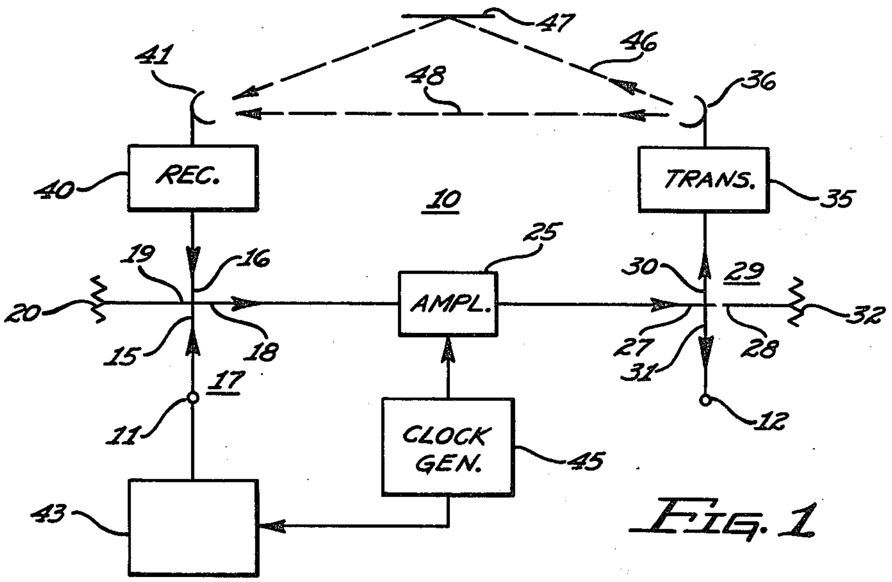
FIG. 1 is a block diagram illustrating an embodiment of the present invention.

Referring to FIG. 1, a recirculation loop 10 is shown having an input terminal 11 and an output terminal 12. Input terminal 11 is connected to one arm 15 of a conjugate pair of arms 15–16, of hybird junction 17. A suitable hybrid junction for use in the information storage system of FIG. 1 is described by J. F. Reintjes and G. T. Coate, "Principles of Radar" 3rd Edition—McGraw-Hill Book Co., Inc., New York, pages 825–839, 1953. A hybrid junction is a device provided with two pairs of conjugate arms and wherein, if the arms are suitably terminated, a signal supplied to one arm of one conjugate pair will divide equally between the two arms of the other conjugate pair, and no portion of the applied signal will enter the other arm of said one conjugate pair. Arms 15 and 16 are one conjugate pair, and arms 18 and 19 are the other conjugate pair of hybrid junction 17. A dissipative member 20 properly terminates arm 19; therefore, the electromagnetic input signal entering arm 15 divides equally between arms 18 and 19 and no portion thereof enters arm 16. That portion of the signal entering arm 19 is dissipated in dissipative number 20 whereas that portion entering arm 18 enters the recirculation loop 10. Conjugate arm 18 is connected to the input terminal of an amplifier 25; the output signal from amplifier 25 is applied to conjugate arm 27 of conjugate pair of arms 27–28 of hybrid junction 29. The other pair of conjugate arms 30 and 31 of hybrid junction 29 are connected to a transmitting device 35 and the output terminal 12 respectively. Conjugate arm 28 is terminated in a dissipative member 32. The transmitting device 35 is provided with a directional radiating means 36 which may be any suitable means for concentrating electromagnetic energy along a selected path. A receiving device 40, provided with a radiation receiving means 41 is positioned in fixed spaced-apart relation to the transmitting device 35. The radiation receiving means 41 is oriented to receive the radiation emitted by the directional radiation means 36. The receiving device 40 is connected to the conjugate arm 16 of hybrid junction 17. The recirculation loop 10 may be provided with electromagnetic signals representing digital information from any suitable source.

A suitable read-in system 43 provides electromagnetic signals at the input terminal 11 of the recirculation loop 10; these signals may contain digital information in one of several forms. A suitable system for reading into a recirculating memory is described and claimed in application Serial Number 91,518 by William A. Edson, filed February 24, 1961, and assigned to the assignee of the present invention.

Synchronization of the recirculating electromagnetic signals with the incoming signals from read-in system 43, and with the computer of which the present system may be a part, may be obtained by the application of a clock pulse from a clock pulse generator 45 to the amplifier 25. The amplifier 25 may be any suitable amplifier for amplifying electromagnetic signals having a frequency in the microwave region of the frequency spectrum; accordingly, the signals from the clock generator 45 may be applied to the amplifier 25 to control the amplification thereof. For example, if amplifier 25 is a traveling-wave-tube type of amplifier, the pulses from the clock generator 45 may be applied to a grid at the electron stream source end of the tube to thereby effectively decrease the amplification of the amplifier. Thus, the recirculating electromagnetic signals in the recirculation loop 10 are resynchronized once during each traversal of the recirculation loop. Since the clock generator 45 provides synchronizing signals to the electromagnetic signal source as well as to the recirculation loop 10, the signal circulating in the recirculation loop 10 will be synchronized with the electromagnetic signal source and the remainder of the computer in which the present invention is to be utilized.

Figure 2:
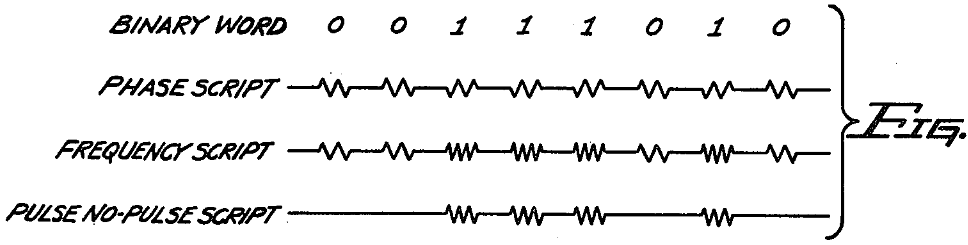
FIG. 2 is a table showing various waveforms useful in illustrating the operation of the embodiment of FIG. 1.

In operation, electromagnetic signals representing digital informaton are applied to terminal 11 of the recirculation loop 10. The form of the digital information applied to the terminal 11 is not critical; for example, a pulse no-pulse script, as described previously, may be utilized to represent bits of a binary word. Similarly, the information to be applied to terminal 11 may be in phase script or frequency script. Referring to FIG. 2, a hypothetical binary word containing eight bits is shown with the corresponding representation of each bit in the various scripts positioned beneath the respective bit. Thus, it may be seen that the binary word 00111010 is an eight bit word which may be represented by bursts of RF energy containing in-phase or out-of-phase alternating microwave components (phase script), or may be represented by bursts of RF energy each of the bursts having one or two frequencies (frequency script), or may be represented merely by the presence or absence of bursts of RF energy (pulse no-pulse script).

The electromagnetic signals applied to terminal 11 travel through conjugate arm 15 and are equally divided between conjugate arms 18 and 19. That portion of the electromagnetic signal traveling arm 19 is dissipated in dissipative member 20; that portion of the electromagnetic signal traveling conjugate arm 18 is applied to amplifier 25. The amplifier 25 provides amplification and resynchronization of the electromagnetic signals and applies these signals to conjugate arm 27 of the hybrid junction 29. The signal traveling conjugate arm 27 is equally divided between conjugate arms 30 and 31; that portion of the electromagnetic signal traveling conjugate arm 31 is applied to an output terminal 12. That portion of the electromagnetic signal traveling conjugate arm 30 is applied to the transmitting device 35. The signals from conjugate arm 30 may be applied directly to a directional radiating means; however, the transmitting device 25 is shown, interposed between the conjugate arm 30 and the directional radiating means 36, to illustrate that it may be necessary to further amplify the electromagnetic signals before radiation. The electromagnetic signals are thus applied to the directional radiating means 36 and are directed along a desired path 46 to a reflecting device 47 and thence to the radiation receiving means 41. Alternatively, the directional radiating means 36 may be oriented to direct the radiations therefrom along a direct path 48; however, the utilization of a reflecting device such as 47 provides an additional delay and permits the transmitting device 35 and receiving device 40 to be physically located in close proximity to each other. The electromagnetic signals received by the radiation receiving means 41 may be applied directly to the conjugate arm 16 of hybrid junction 17; however, receiving device 40 is shown interposed between the radiation receiving means 41 and conjugate arm 16 to indicate that amplification of the received electromagnetic signals may be necessary before applying them to the amplifier 25 through the hybrid junction 17. Subsequently, electromagnetic signals thus received are recirculated through the amplifier 25, re-radiated by the directional radiation means 36, received by the receiving means 41, and recirculated indefinitely until the information is replaced by new information applied at terminal 11.

The reflecting device 47 may conveniently take the form of a transponder, that is, a pulse repeater, for receiving the electromagnetic radiations from the directional radiating means 36 and re-radiating these electromagnetic signals to the radiation receiving means 41.

Figure 3:
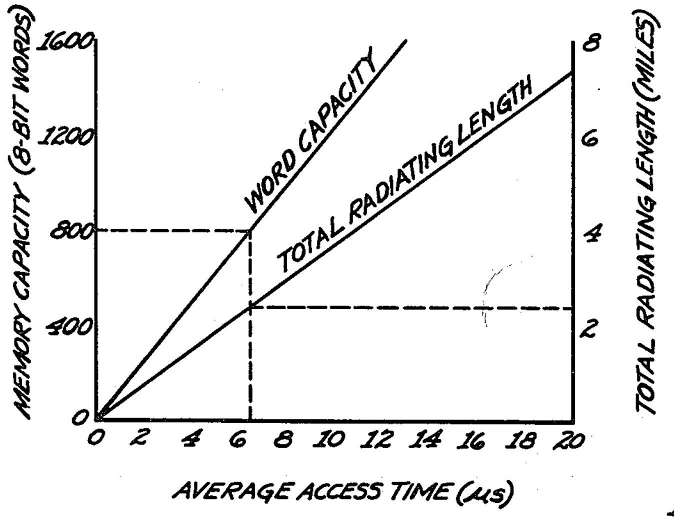
FIG. 3 is a graph showing the relationship of various quantities involved in the operation of the present invention.

Referring to FIG. 3, a graph is shown representing the memory capacity, the total loop length, and the average access time of a recirculation loop constructed in accordance with the teachings of the present invention. The graph is constructed on the basis of an eight bit word, similar to that shown in FIG. 2, having a bit period of two millimicroseconds ($2\times10^{-9}$ seconds). Thus, it may be seen, for example, that an 800 word memory system constructed in accordance with the teachings of the present invention would provide a storage system having an average access time of approximately 6.5 microseconds, and would have a total radiating length of approximately 2.4 miles.

Figure 4:
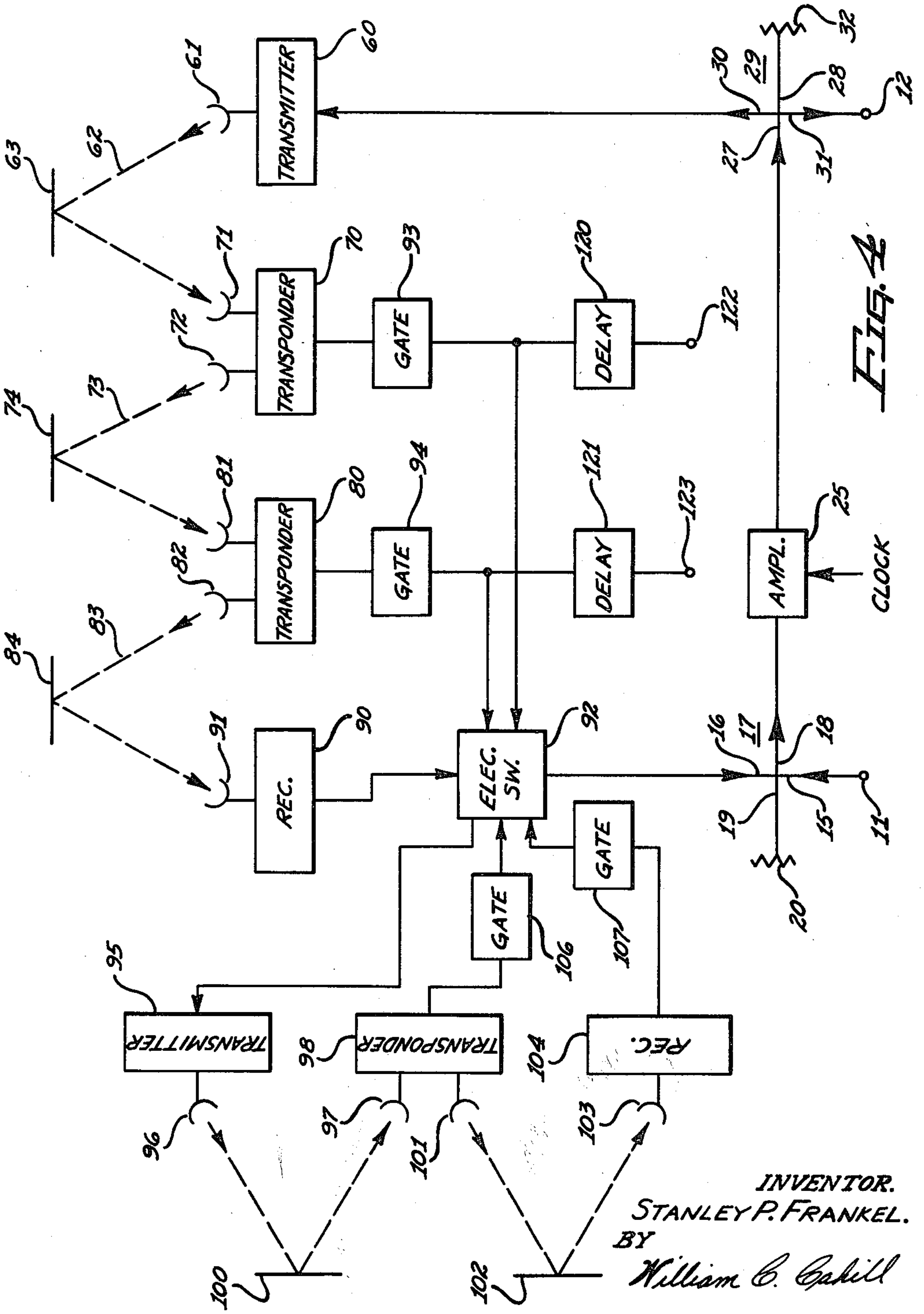
FIG. 4 is a block diagram showing another embodiment of the present invention.

Referring to FIG. 4, a modification of the recirculation loop 10 of FIG. 1 is shown. The input terminal, output terminal, hybrid junctions, and amplifier of FIG. 4 are identical to that of FIG. 1 and are numbered accordingly. The conjugate arm 30 of the hybrid junction 29 is connected to a transmitter 60 having a directional radiating antenna 61. The directional antenna 61 is positioned to provide maximum radiation along a path 62 directed toward a reflector 63. A transponder 70, provided with a receiving antenna 71 and a directional radiating antenna 72, is positioned to receive the electromagnetic radiations from the transmitter 60 reflected by the reflector 63, and re-radiates these electromagnetic signals from the directional radiating antenna 72 along path 73 to a second reflector 74. Similarly, a second transponder 80 is provided to receive electromagnetic signals, reflected from the reflector 74, through a receiving antenna 81 and re-radiate the electromagnetic signals through a directional radiating antenna 82. The directional radiating antenna 82 is positioned to provide maximum radiation along a path 83 directed toward a reflector 84. A receiver 90 having a receiving antenna 91, receives the electromagnetic signals reflected by the reflector 84 and provides these signals to an electronic switch 92. The electronic switch is connected to conjugate arm 16 of hybrid junction 17 to therefor provide a complete recirculation path for the electromagnetic signals inserted in the recirculation loop. Transponders 70 and 80 are connected to the electronic switch 92 through gates 93 and 94, respectively. The electronic switch 92 is coupled to a second transmitter 95 having a directional antenna 96 for radiating electromagnetic signals to a receiving antenna 97 of a transponder 98 by reflecting the electromagnetic signals off of reflector 100. Similarly, transponder 98 radiates electromagnetic signals from directional radiating antenna 101 to a reflector 102 and thence to a receiving antenna 103 of a receiver 104. Transponder 98 and receiver 104 are coupled to the electronic switch 92 through electronic gates 106 and 107, respectively.

The operation of the storage system of FIG. 4 may be described as follows. Electromagnetic signals to be stored in the storage system of FIG. 4 are applied to the input terminal 11. The signals are thus applied to the amplifier 25 through conjugate arm 18 of hybrid junction 17 and are amplified and resynchronized through the medium of the clock pulse applied to the amplifier 25. The amplified electromagnetic signals travel through conjugate arm 27 and conjugate arm 30 of hybrid junction 29, and are subsequently applied to the transmitter 60. The electromagnetic signals are thus radiated by the directional radiating antenna 61, are then reflected by the reflector 63 and received by the receiving antenna 71. The signals are then successively radiated by directional antennas 72 and 82, reflected by reflectors 74 and 84, and received by receiving antennas 81 and 91. The electromagnetic signals thus received by the receiver 90 are applied to electronic switch 92 and subsequently to the conjugate arm 16 of the hybrid junction 17. The signals are thus applied to amplifier 25 and are resynchronized and amplified therein and recirculated in the storage system. Each bit of each word circulating in the storage system of FIG. 4 is thus transmitted, received and retransmitted serially; consequently, if it is desired to read out the information recirculating in the storage system, it will be necessary to wait until the appropriate portion of the recirculating information arrives at the hybrid junction 29 to be sensed at output terminal 12 through conjugate arm 31. To reduce the access time, and permit information to be more readily available at the output terminal 12, electronic gates 93, 94, 106, and 107 are provided, and receiver 104, transponder 98, and transmitter 95 permit reinsertion of information bypassed by the read-out operation.

Thus, if it is desired to read out information contained in the electromagnetic signal traversing the radiation path 62 between the directional radiating antenna 61 and reflector 63, gate 93 may be "opened" and the information subsequently received by the receiving antenna 71 of the transponder 70 may be applied to the electronic switch 92 through the gate 93 and applied to the output terminal 12 without having to first wait for the information contained in the radiation paths 73 and 83 to pass the hybrid junction 29. Having "bypassed" the electromagnetic signals stored in radiation paths 73 and 83, the electronic switch may permit the re-radiation of the information in path 83 by applying the electromagnetic signals in path 83, when they arrive at the electronic switch 92, to the transmitter 95 to be transmitted via reflector 100 to the transponder 98. Thus, during the time that the information stored in the electromagnetic signals traveling radiation path 62 are being passed by the electronic switch to the hybrid junction 17, the information contained in the electromagnetic signals traveling path 73 is transferred to the new radiation path 83, and the information stored in the electromagnetic signals formerly traveling path 83 is transferred to the radiation path between transmitter 95 and transponder 98. Therefore, gate 106 may be opened and gate 93 may be closed after the "reading" of the electromagnetic signals traveling radiation path 62. Therefore, the information contained in the electromagnetic signals traveling radiation paths 73 and 83 is re-inserted into the recirculation loop even though some of the information (that represented by the electromagnetic signals traveling radiation path 62) has been "read out" of the recirculation loop first.

If it is desired to read the information contained in radiation path 73 first, the information contained in path 62 second, and finally the information contained in path 83, gate 94 may be opened, and the information contained in radiation path 83 re-radiated from transmitter 95 to the transponder 98, and finally to the receiver 104. By the time the information contained in 83 arrives at receiver 104, the information in radiation paths 73 and 62 have been read out through gate 94 and electronic switch 92. Therefore, gate 107 may be opened and the information previously contained in radiation path 83 may be applied to the electronic switch 92 and subsequently read out.

Obviously, the modification shown in FIG. 4 may be useful for interchanging the serial sequence of word or groups of words, and may be used to read out designated portions of the recirculating information, and reinsert or substitute information therefor. Further, the modification of FIG. 4 may be utilized to "read" in parallel the information serially inserted into the recirculation loop. This latter function is provided by gates 93 and 94 which, when opened simultaneously, permit the information contained in radiation paths 62 and 73 to be applied to delay elements 120 and 121, respectively. After a delay provided by delay elements 120 and 121 (determined by the delay of the information contained in radiation path 83 while traveling from receiver through electronic switch 92 and amplifier 25 to output terminal 12), the information contained in radiation paths 62 and 73 is provided at output terminals 122 and 123 in parallel with the information contained in radiation path 83 at output terminal 12.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operation requirements, without departing from those principles. The appended claims are therefore intended to cover and embrace any such modifications, within the limits only of the true spirit and scope of the invention.

What is claimed as new and described to secure by Letters Patent of the United States is:

1. In an information storage system for storing digital information, a source of electromagnetic signals containing information in digital form, a recirculation loop coupled to said source for recirculating said electromagnetic signals comprising, means for amplifying said electromagnetic signals, a directional radiating means coupled to said amplifying means for radiating said electromagnetic signals through an unconfined non-guiding fluid, redirecting means in fixed spaced-apart relation to said radiating means for redirecting said electromagnetic signals radiated by said radiating means, receiving means in fixed spaced-apart relation to said redirecting means for receiving the electromagnetic signals redirected by said redirecting means, and means for permitting the recirculation of said electromagnetic signals including means coupling the electromagnetic signals received by said receiving means to said amplifying means.

2. In an information storage system for storing digital information, a source of electromagnetic signals containing information in digital form, a recirculation loop coupled to said source for recirculating said electromagnetic signals comprising, means for amplifying said electromagnetic signals, a directional radiating means coupled to said amplifying means for radiating said electromagnetic signals through an unconfined non-guiding fluid, receiving means in fixed spaced-apart relation to said radiating means for receiving the electromagnetic signals radiated by said radiating means, and means for permitting the recirculation of said electromagnetic signals including means coupling the electromagnetic signals received by said receiving means to said amplifying means.

3. In an information storage system for storing digital information, a source of electromagnetic signals containing information in digital form, a recirculation loop coupled to said source for recirculating said electromagnetic signals comprising, a directional radiating means for radiating said electromagnetic signals through an unconfined non-guiding gas, reflecting means in fixed spaced-apart relation to said radiating means for reflecting said electromagnetic signals radiated by said radiating means, receiving means in fixed spaced-apart relation to said reflecting means for receiving the electromagnetic signals reflected by said reflecting means, means coupled to said receiving means for amplifying the electromagnetic signals received thereby, a source of clock pulses coupled to said amplifying means for synchronizing said source of electromagnetic signals with the electromagnetic signals being recirculated, and means coupling the amplified electromagnetic signals to said radiating means.

4. In an information storage system for storing digital information, a source of electromagnetic signals containing information in digital form, a recirculation loop coupled to said source for recirculating said electromagnetic signals comprising, means for amplifying said electromagnetic signals, a directional radiating antenna coupled to said amplifying means for radiating said electromagnetic signals through the atmosphere, a reflector in fixed spaced-apart relation to said radiating antenna for reflecting said electromagnetic signals radiated by said antenna, a directional receiving antenna in fixed spaced-apart relationship to said reflector for receiving electromagnetic signals reflected by said reflector, means coupling the electromagnetic signals received by said receiving antenna to said amplifying means, and a source of clock pulses coupled to said amplifying means for synchronizing said source of electromagnetic signals with the electromagnetic signals being recirculated.

5. In an information storage system for storing digital information, a source of electromagnetic signals containing information in digital form, a recirculation loop coupled to said source for recirculating said electromagnetic signals comprising, means for amplifying said electromagnetic signals, a directional radiating means coupled to said amplifier for radiating said electromagnetic signals through an unconfined non-guiding fluid, a first redirecting means in fixed spaced-apart relation to said radiating means for redirecting said electromagnetic signals radiated by said radiating means, a repeating means in fixed spaced-apart relation to said first redirecting means for receiving and radiating said electromagnetic signals redirected by said first redirecting means, a second redirecting means in fixed spaced-apart relation to said repeating means for redirecting said electromagnetic signals radiated by said repeating means, receiving means in fixed spaced-apart relation to said second redirecting means for receiving said electromagnetic signals redirected by said second redirecting means, and means for permitting the recirculation of said electromagnetic signals including means coupling the electromagnetic signals received by said receiving means to said amplifying means.

6. In an information storage system for storing digital information, a source of electromagnetic signals containing information in digital form, a recirculation loop coupled to said source for recirculating said electromagnetic signals comprising, means for amplifying said electromagnetic signals, a directional antenna coupled to said amplifying means for radiating said electromagnetic signals through the atmosphere, a first reflector in fixed spaced-apart relation to said antenna for redirecting said electromagnetic signals radiated by said antenna, a transponder in fixed spaced-apart relation to said first reflector for receiving and re-radiating said electromagnetic signals redirected by said first reflector, a second reflector in fixed spaced-apart relation to said transponder for redirecting said electromagnetic signals re-radiated by said transponder, receiving antenna in fixed spaced-apart relation to said second reflector for receiving said electromagnetic signals redirected by said second reflector, means coupling the electromagnetic signals received by said receiving antenna to said amplifying means, and a source of clock pulses coupled to said amplifying means and said source of electromagnetic signals for synchronizing said source of electromagnetic signals with said electromagnetic signals being recirculated.

References Cited by the Examiner

UNITED STATES PATENTS

| | | | |
|---|---|---|---|
| 2,604,621 | 7/52 | Earp et al. | 343—15 |
| 2,797,862 | 7/57 | Andrews | 235—165 |
| 2,837,738 | 6/58 | Valkenburgh | 343—112 |
| 2,914,249 | 11/59 | Goodall | 340—173 |
| 2,920,294 | 1/60 | Keith | 333—30 |
| 2,932,021 | 4/60 | Chaffee | 343—15 |
| 2,987,253 | 6/61 | Schreiner et al. | 235—176 |
| 3,044,017 | 7/62 | Lewis | 235—176 |

IRVING L. SRAGOW, *Primary Examiner.*